Shaft 76 moves in synchronism with cylinder 16

Inventors:
Paul Langevin + Charles Louis Horion
By Mauro + Lewis
Attorneys

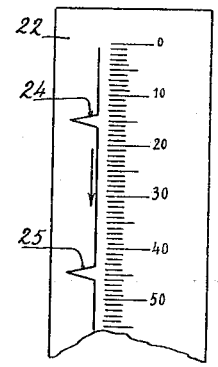
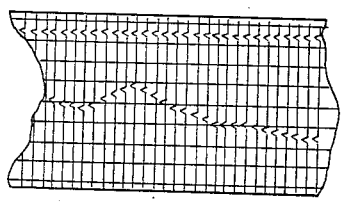
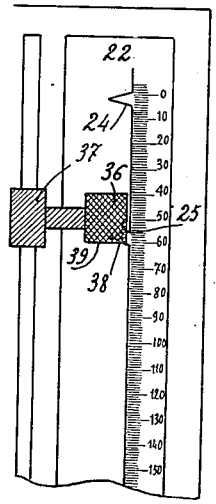
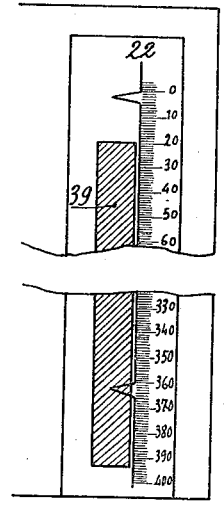
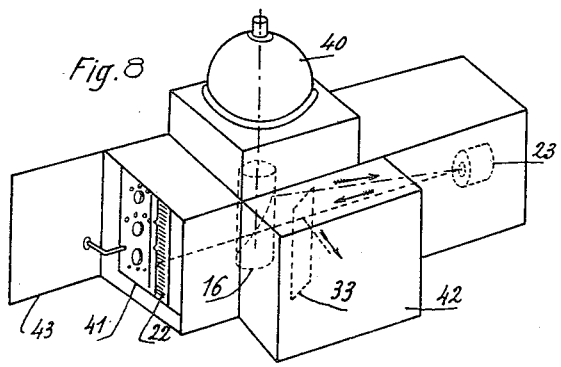

May 17, 1932. P. LANGEVIN ET AL 1,858,931
METHOD AND APPARATUS FOR SOUNDING AND FOR LOCATING SUBMARINE
OBSTACLES BY MEANS OF ULTRA AUDIBLE WAVES
Filed Dec. 8, 1924    3 Sheets-Sheet 3

Patented May 17, 1932

1,858,931

UNITED STATES PATENT OFFICE

PAUL LANGEVIN AND CHARLES LOUIS FLORISSON, OF PARIS, FRANCE, ASSIGNORS TO SOCIETE DE CONDENSATION ET D'APPLICATIONS MECANIQUES, OF PARIS, FRANCE, A CORPORATION OF FRANCE

METHOD AND APPARATUS FOR SOUNDING AND FOR LOCATING SUBMARINE OBSTACLES BY MEANS OF ULTRA-AUDIBLE WAVES

Application filed December 8, 1924, Serial No. 754,615, and in France December 27, 1923.

The present invention relates to methods and apparatus for producing and receiving ultra-audible waves as set forth in patent application of Paul Langevin, Serial No. 390,542, filed June 21, 1920, for the accurate determination of the distance of any submarine obstacle capable of reflecting ultra-audible waves.

The method herein utilized consists in emitting, by means of the piezo-electric apparatus described in the said patent, a short signal consisting of a set of ultra-audible waves, and in measuring the time $t$ between the beginning of the emission and the beginning of the reception of the waves reflected from the obstacle, i. e. the commencement of the echo.

Since the constant speed of propagation of the elastic vibrations in water is a known factor, or $v$, the distance $x$ of the obstacle from the emitting and receiving apparatus will be given by the ratio $$x = \frac{vt}{2}$$

The apparatus by which the method of the present invention is carried into effect comprises:

I. A piezo-electric device for converting the electric oscillations into elastic vibrations, or conversely, termed emitting and receiving device for ultra-audible waves.

II. An apparatus for producing electric oscillations, termed electric emitting outfit.

III. A receiving and amplifying device for detecting the ultra-audible emission and its echo.

IV. An automatic synchronizing device for controlling the emission and for measuring the distance, providing for the direct and practically continuous reading of the distance or the registering of the curve of the distance in relation to the time, or further, the operation of a signal device.

V. An aggregate of connections and semi-automatic controls between the various devices above mentioned, providing for their combined operation.

The following description, with reference to the appended drawings which are given by way of example, sets forth the said invention.

Fig. 4 shows a graduated scale upon which the spot of light is displaced, as well as the form of its path;

Fig. 5 is a view of the photographic film obtained by means of the registering device shown in the general view of Fig. 1;

Fig. 6 shows a suitable signal device for minimum distance, and

Fig. 7 is a like view for signalling the presence of an obstacle.

Fig. 8 is a perspective view showing constructional forms of the several controlling and measuring apparatus in the case in which a device with a beam of light is employed.

I. The emitting and receiving device for ultra-audible waves which is herein utilized is the device forming the subject-matter of patent application of Paul Langevin, Serial No. 390,542, filed June 21, 1920.

In the present application, the emission and the reception of the ultra-audible waves are obtained either by means of a single piezo-electric element whose operation is reversible, or by means of two piezo-electric elements whereof one serves as an emission device for ultra-audible waves and the other as a receiver.

The said apparatus is arranged as follows:

(*a*) For locating submarine obstacles of any kind, the combined emitting and receiving device for ultra-audible waves, may be disposed in any suitable support or frame whereby it may be turned in all directions.

(*b*) In the particular case of sounding operations, the combined emitting and receiving device for ultra-audible waves may be disposed with its emitting face in the horizontal position, in a permanent outfit disposed in an opening in the hull of the vessel which is closed when not in use by means of a suitable cover 50 (Fig. 9), or it may be disposed in any other suitable manner about the vessel or an object traveling with the vessel.

II. The apparatus producing electric oscillations, termed electric emitting outfit must fulfil a particular condition, i. e. the signal and its echo should not have any portion in common, with reference to the time, so that the signal must have a shorter duration according as the distances to be measured are shorter.

For sounding operations the duration of the emission should be less than 1/1000 second.

The form of the ultra-audible emission, and hence that of the electric emission, is herein a single set of damped oscillations. The emitting device consists of a special electric emission outfit of the spark type, excited by impulses, and setting off at each emission a single set of waves under the control of an automatic apparatus.

Figure 1:
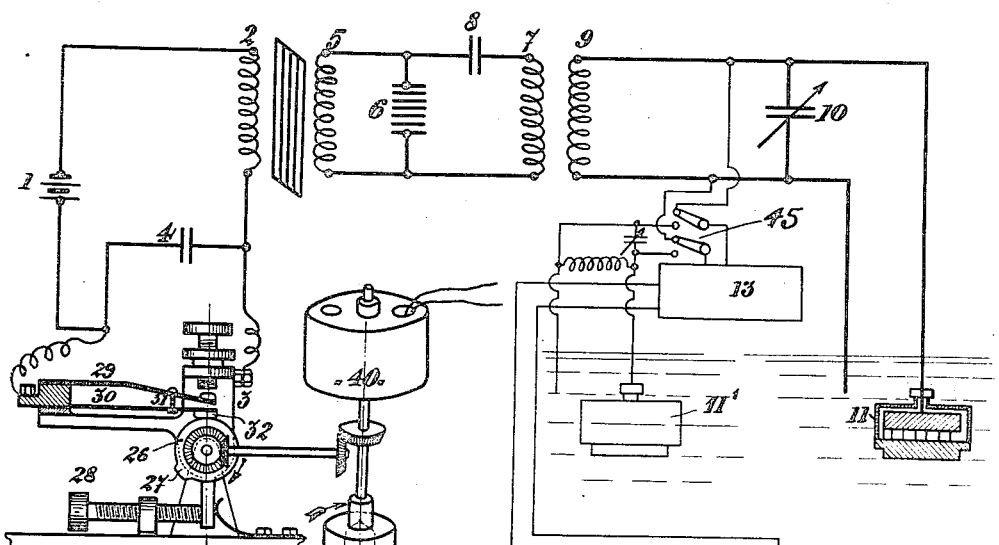
Fig. 1 is a diagrammatic view of the sounding apparatus according to our invention.
Figure 2:
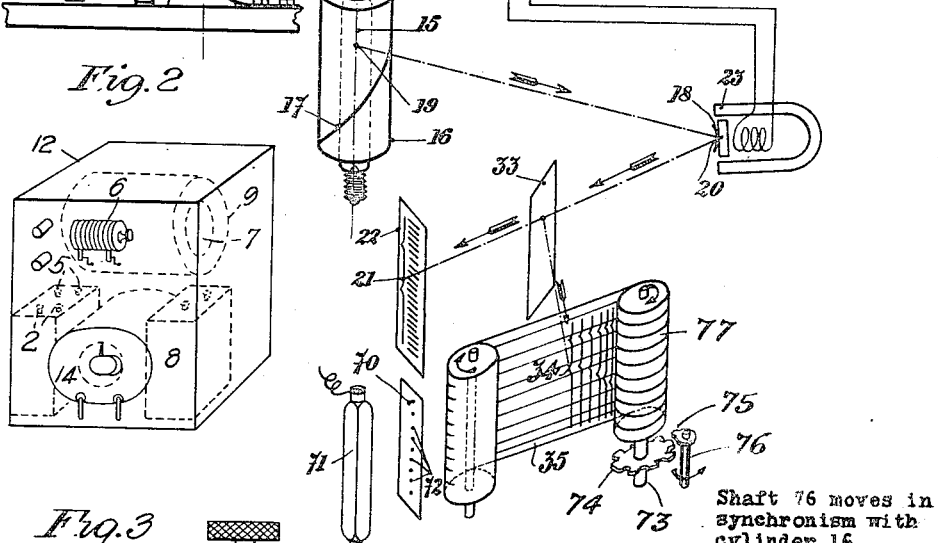
Fig. 2 is a perspective view of the emitting and receiving device.

The emitting device is shown diagrammatically in Fig. 1 and in perspective in Fig. 2. It comprises a storage battery 1 of low voltage and large output, and its discharge circuit consists of a primary 2, an induction coil, and a special circuit-breaking key 3 which is shunted by a protecting condenser 4. The secondary 5 of the transformer supplies the impulse circuit comprising the sectioned spark break 6 to whose terminals are connected in series the impulse self-induction coil 7 and a capacity 8.

The values of this self-induction L and of the said capacity C are so regulated that $$2\pi\sqrt{LC}=\frac{1}{N}$$

in which N is the frequency of the mechanical resonance of the ultra-audible emitting and receiving device.

The oscillating circuit properly so called comprises a self-induction coil 9 coupled to the said impulse coil, a capacity 10 for regulating the frequency and the damping of the set of waves, and the piezo-electric condenser 11. The circuit is so regulated that the frequency of the electric oscillations shall be exactly equal to N, in order to utilize the properties of mechanical resonance of the ultra-audible emitting and receiving device.

When the current is sent into the primary of the transformer due to the opening of the key 3 caused by the operation of the synchronizing control device—as will be hereinafter set forth—an electro-motive force will be produced in the secondary of the transformer having a rapidly increasing value; when the resulting potential difference attains the disruptive limit at the terminals of the sectioned spark break 6, the condenser 8 will discharge in a few oscillations, thus producing in the oscillating circuit a single set of damped waves whose duration is below 1/1000 second.

The said elements are placed together in a closed metallic case 12, Fig. 2, which is grounded to the general metal structure and serves as an electromagnetic screen protecting the receiving end against parasitic induction from adjacent electric conductors or apparatus.

III. The receiving and amplifying device for the ultra-audible signal and its echo is arranged as follows:

The electric oscillations prevailing during the emission and during the reception of the echo in the oscillating circuit connected to the terminals of the ultra-audible emitting and receiving device 11 of the reversible type, actuate an amplifying and detecting device 13, Fig. 1, whose input circuit is connected to the terminals of the said oscillating circuit.

The emission and the echo are thus converted into pulsations of current in the output circuit of the amplifier. The initial points of the two pulsations limit the time $t$ representing the distance from the obstacle, which time is measured by the synchronizing device controlling the emission and measuring the distance.

A separate receiving device 11' is arranged to be connected with the input circuit of the amplifier 13 in place of the device 11 through a double-pole, double throw, transfer switch 45 in a manner which will be obvious upon inspection of Fig. 1. It will be clear from the above that when the transfer switch 45 is thrown down, the operation of the system will be the same except that the electrical receiving device 13 will receive both the emitted signal and the echo through the receiving piezo-electric element 11'.

IV. The said synchronizing device controlling the ultra-audible emission and measuring the distance comprises a device actuated by a constant speed motor whereby the ultra-audible emission is started in synchronism with the operation of the device for measuring the distance $x$.

This measurement of $x$ is made by means of the displacement at constant speed, during a time $t$, of a mark made by a pointer (or the like) upon a graduated scale, said mark being made by mechanical or photographic means or the pointer or indicator read upon a scale.

Below will be described the whole arrangement consisting of the synchronizing device and of the special measuring device based upon the use of the rectilinear and uniform motion of a spot of light upon a fixed scale.

The said arrangement comprises:

(a) A device actuated by a constant speed motor and causing a spot of light to describe a rectilinear trajectory at a constant and known speed.

(b) A device for marking upon the said trajectory the position of the spot at the instant of the emission of the ultra-audible waves and its position at the instant of reception of the echo; these two positions limiting the stated portion of the trajectory represent the time $t$.

(c) The device actuated by the constant speed motor providing for the starting of the ultra-audible emission in synchronism with the devices set forth in paragraphs (a) and (b), and enabling the immediate and direct reading of the length of this portion of the trajectory.

(d) A device for the continuous and automatic registering of the curve representing the distance $x$ in relation to the time. For the particular case of sounding operations, the curve for the sea bottom can thus be taken in relation to the time or to the distance covered by the sounding vessel.

(e) A signal device which operates when the distance or depth falls below a certain limit fixed by the observer, or by the presence of any obstacle.

(a)

In order to obtain a spot of light having a uniform straight motion at a known speed, one may employ for example the device shown in Fig. 1.

The straight filament 15 of an incandescent lamp is coaxial with an opaque cylinder 16 surrounding the lamp and having therein a narrow helical slot 17.

The rays from the point of the slot which is lighted by the said filament fall upon the centre 20 of the said mirror 18 which latter will produce a real image 21 upon a translucent scale which is parallel to the axis of the cylinder 16. The said cylinder is rotated upon its axis by a constant speed motor 40, and the spot 21 is thus given a straight line movement upon the scale. Since the pitch of the helix 17 is known, as well as the distance between filament and mirror, and mirror and scale, the velocity of the spot 21 along the scale is thus constant and known. The distance covered by said spot on the graduated scale during a time $t$ is proportional to this time, with a known coefficient of proportionality. The said scale is directly graduated in distances $x$.

(b)

The recording upon the scale of the ends of the above-mentioned portion of the trajectory representing the distance $x$ is effected as follows:

The mirror 18 pertains to a galvanometer device or to a detector of electric current 23, Fig. 1, which is suitably rapid and damped; its axis of rotation is parallel to the axis of the cylinder 16. The terminals of the galvanometer (or detector) are connected to the receiving device 13 either directly or inductively, so that any signal or echo, represented by a pulsation of current, will give to the mirror an abrupt deflection followed by an immediate return to the zero position. The resultant of the rectilinear motion of the spot due to the rotation of the cylinder 16, and of the motion at right angles to the first one of said spot due to the deflection of the mirror, is shown on the scale as an indentation or notch upon the path of light of the spot, so that the portion of this path representing the value of $x$ will be bounded by the initial points of two notches 24 and 25, as shown in Fig. 4. It should be noted that, owing to the fact that this device 13 comprises, in the usual manner, three electrode electron tubes, it is possible to simplify the operation of the galvanometer. For, if these tubes are operated in the vicinity of their region of saturation, very different currents will be amplified to substantially the same values. Under these circumstances emission and reception will produce about the same pulsations of current in the circuit of the galvanometer, while otherwise the emission pulsation would be much stronger than the reception pulsation; which would necessitate special arrangements such as the shunting of the galvonmeter during the emission.

It is necessary to read and to measure the distance between the initial points of the notches. If the said emission device for ultra-audible waves were started at any point in time, the portion or section 24—25 would be formed at any place on the trajectory, and the eye could not take account of its length. The following arrangements are employed in order to bring the emission notch into a predetermined position on the scale.

(c)

Figure 3:
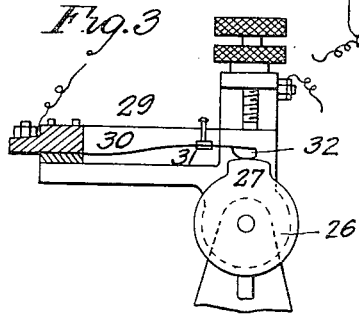
Fig. 3 is a detail view of the device for controlling the emission of the ultra-audible waves, said device being shown in a position different from that illustrated in the general view of Fig. 1.

This device for the synchronous starting of the emitted ultra-audible waves provides for the direct reading of the length of the section 24—25, representing either distance or depth, and is shown in Figs. 1 and 3.

The shaft of the cylinder 16 actuates either directly or through speed-reducing means a shaft 26 carrying a quick-motion cam 27 with an abrupt projection; when the said cam passes through a given angular position, it closes a switch device 3. The switch is so disposed as to turn about the shaft 26 and can be set in any desired angular position upon the axis by means of the screw 28.

The circuit of the battery and the primary winding passes through the switch 3. A set of waves is emitted when the circuit is broken, i. e. when the cam is disengaged from the spring 30, (Fig. 3). This break is made abrupt by the release of the contact strip 29 by means of the spring 30, through the medium of the stud 31; when the stud rises it passes through an aperture in the strip 29, but on its descent—when the friction piece is disengaged from the cam—its flat head draws down the strip 29 in an abrupt manner, thus breaking the circuit.

The setting of the switch upon the axis of the cam and the position of the scale are so combined that the emission is started when the spot of light 21 passes before a certain division of the graduated scale, and for this reason the section 24—25 to be measured will have a fixed initial point 24, so that the observer will be occupied solely with the end 25.

It will be obvious that a source of continuous waves may be substituted for the source of damped waves shown, and the switch 3 used to momentarily connect the source with the circuit 9—10.

The successive automatic startings of the emitted wave sets are sufficiently close together in order that the distance to be measured between any two consecutive emissions may always be small, and the displacement of the notch 25 due to the echo will thus be relatively slow, and the observer can read with facility the number of the scale division coinciding with the initial point. The said scale is graduated directly in distances or in depths, and is so positioned as to height that the initial point of the notch 24 is brought into exact coincidence with the scale division representing the depth of the immersion of the said emitting and receiving device mounted upon the vessel. The screen may be rendered adjustable to different heights by the provision of any known or other suitable form of adjustable mounting therefor. The measuring device thus gives an automatic indication of the depth counting from the water level, and not from the position of the emitting and receiving device.

The apparatus is run at high speeds for the measurement of short distances and shallow depths, or slow speeds for the measurement of long distances or great depths. Any known or other suitable method of changing the speed may be utilized.

(d)

The distance $x$ may be registered by photographic means in a continuous and automatic manner. As shown in Fig. 1, in the path of the rays between the mirror 18 and the scale 22 is interposed a clear glass plate 33, which is inclined with reference to the plane of the beam 18—21. A portion of the light is reflected by said plate and produces a second spot of light 34, having the same properties as the first, upon the sensitive surface of a photographic band 35. The distances 33—34 and 33—22 are equal. Since the said band remains stationary during the motion of the said spot, the luminous streak with its two notches 24, 25 as above described will produce a record upon the photographic surface.

Between any two consecutive paths of the spot 34, the band 35 is given a slight lengthwise displacement of constant value, on the order of one millimeter. This displacement of band 35 is obtained by means of a toothed wheel 74 keyed upon the spindle 73 of the right drum 77. A projection or finger 75, mounted upon a shaft 76, moves said toothed wheel through one tooth per revolution of the second spindle. Shaft 76 is driven in synchronism with cylinder 16 by any suitable means. In this manner the photographic band will register successive soundings or distances of obstacles; the said band is then passed into an apparatus which performs the developing, fixing, washing and drying operations, and then issues from the apparatus, having upon its surface a substantially continuous curve of the distance and the depth of the sea bottom relative to the time, having the form indicated in Fig. 5.

A scale graduated in distances is automatically inscribed upon the said band, and to this effect, at a suitable distance from the spot 34 the band travels in the rear of an opaque plate 70 which is pierced along a straight line parallel to the path 34 with small apertures 72 whose spacing represents the unit of measurement; said plate is illuminated by a lamp 71, so that each aperture will mark a line upon the said band which appears in black upon developing. The band 35, the apertured plate and the scale 22, being of course properly adjusted to bring the record into agreement with the scale.

The actual or standard meridian time may be recorded in any known or other suitable manner as by making chronometrically controlled photographic impression upon the band.

The intermittent unwinding of the band, as above disclosed, is effected in synchronism with the movement of the cylinder 16, so that the curve recorded will represent in rectilinear co-ordinates the curve of the distance of the obstacle or of the depth relative to the time. In the particular case of sounding operations, the said band may be driven in proportion to the speed of the ship in any known or other suitable manner as by a log. In this event the band travels, between each sounding operation, for a length proportional to the distance covered by the vessel during this space of time. The curve for the sea bottom is thus obtained in relation to the path covered by the vessel equipped with a sounding apparatus constructed according to the present invention.

Figure 10:
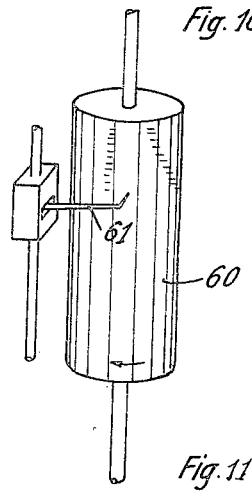
Fig. 10 is a perspective view of a modification of the device for registering the emission and its echo.
Figure 11:
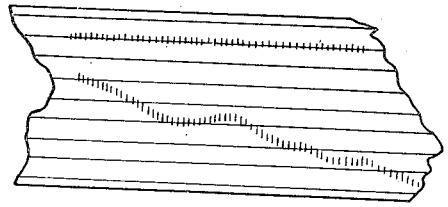
Fig. 11 shows the band disposed upon the cylinder, Fig. 12, in the developed position.

The record may be further obtained by a direct registering by means of a record pen mounted upon the movable element of the said galvanometer or detector. For example a drum 60, Fig. 10, provided with record paper may be rotated in synchronism with the device of Fig. 5 which sets off the ultra-audible emissions, according to the method hereinbefore set forth. The point of the pen 61, would be suitably arranged to enter into contact therewith and mark a line upon the paper in response to the deflections of the galvonometer 23 connected to the said amplifying device 13. The distance between the marked lines which correspond to the emission of a set of waves and to the return of its echo will afford a measurement of the distance of an obstacle or the depth of the sea bottom. It will be obvious that by effecting a relative displacement of the cylinder and galvanometer parallel to the axis of the cylinder, a record of the varying distances may be effected, either in relation to the time, or to the travel of the vessel. Due to the synchronizing, all the records of the starting of the emitted wave sets are situated upon a given generatrix of the cylinder, so that when the paper band is developed flatwise, one will obtain in rectangular co-ordinates the curve of variations in distance or depth, as shown in Fig. 11.

The distance or depth can also be registered upon a paper band in printed figures or characters in the following manner. The constant speed motor controlling the ultra-audible emission by means of the above-indicated arrangement, may actuate three printing wheels $a, b, c$, Fig. 12, arranged to rotate upon a common stationary axle, said wheels being connected together by speed-reducing means such that the speeds of $a, b, c$, will be respectively represented by the numbers 1, 10, 100, all in a manner as well understood in the art. The speed of $c$ in revolutions per second should be $$\frac{v}{10},$$

$v$ being one-half the velocity of sound in water, in meters. The printing wheels $a, b$, should be of like construction and have upon the periphery a set of ten type characters 0, 1, 2, 3, 4; 5, 6; 7, 8, 9, as shown in the figure. In order to print the unit figures in spite of the great speed of the wheel $c$, the latter may be provided with circular raised lines whereof the number increases by unity for each tenth of a revolution, from 0 to 9.

Figure 13:
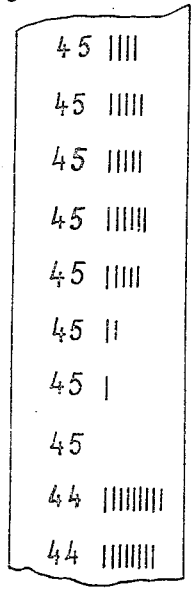
Fig. 13 represents the band for the same, containing the record.
Figure 12:
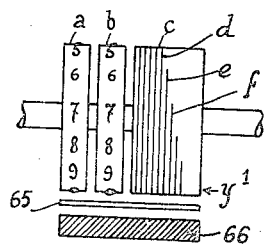
Fig. 12 shows a modified registering device, obtaining an automatic printed record of the distances.

A paper band 65, shown in section in Fig. 12, is situated opposite a generatrix $y^1$ common to the three wheels; the said band being abruptly applied upon $a, b, c$, according to the generatrix $y^1$, at the initial moment of the echo, by means of a flat plate 66 which may be controlled in any known manner as by a quick-acting electromagnetic striker operable in response to impulses in the output circuit of the amplifier. It will be clear that by moving the band 65 transversely of the generatrix $y^1$ a slight degree between each sounding operation a record would be formed by the said printing operation as shown in Fig. 13.

(e)

A signal or alarm actuated device is also provided.

1. In the case of a signal device operating upon minimum values of distance or depth, the arrangement comprises (Fig. 6) a cell 36 which is sensitive to light, either a selenium cell or a photo-electric cell, having a small surface and mounted upon a slide 37, which is movable along a graduated scale 22. The said cell has a lateral position such that the line formed by the spot of light is spaced at about 1 mm. from the side 38 of the cell.

As the distance to be measured is reduced, the notch or peak 25 forms on the scale 22, nearer and nearer the top until it finally attains the lower edge 39 of the scale 36. We then utilize the resulting electrical effect in any suitable manner, to give notice that said action has taken place. The operator can thus adjust the cell 36 so that this lower edge 39 coincides with the scale division corresponding to the minimum depth for which such warning or notice is to be given.

2. Should a warning of the presence of an obstacle be desired, Fig. 7, the small cell shown in Fig. 6 is replaced by a long cell 39 occupying the major part of the graduated scale, Fig. 7. The cell will then respond to effect a warning when an obstacle appears at any distance comprised between those distances represented on the scale between the ends of the cell 39.

The several devices hereinbefore described are contained in a closed metallic box of a rigid construction.

Fig. 8 is a perspective view of an arrangement comprising the said apparatus controlling the emission of the waves and the said measuring apparatus employing the spot of light. At 40 is the constant speed motor with its change-speed device and the automatic break device for the emissions. The straight filament lamp is mounted on a base which is adjustable in all directions and is disposed upon the lower part of the main frame; it is surrounded by the cylinder 16.

The said galvanometer device, or the current detector, is disposed at 23 in a universal joint arrangement which can be adjusted from the front board 41 of the apparatus, whereby the vertical and lateral regulation of the spot of light can be obtained. At 33 is disposed a glass plate reflecting a portion of the light into the photographic registering device 42, which is provided with the said developing, fixing, washing and drying device 42.

V. The several apparatus are connected in the following manner.

The main controlling switches of the various circuits of the controlling and registering apparatus are disposed upon a switchboard adjacent the graduated scale, and to these is added a general two-way switch which is actuated by the door 43, Fig. 8, and is adapted to close the circuit of the controlling and registering device. It closes the circuits of said device, and the latter are thus actuated, when the said door is opened at the beginning of the operation; it also opens the circuits when the door is closed at the end of the operation.

Figure 9:
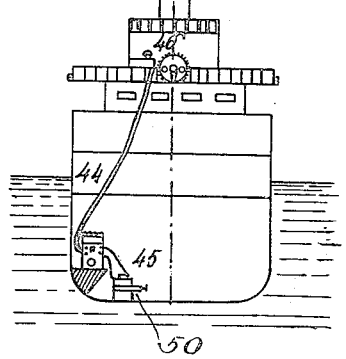
Fig. 9 is a diagrammatic sectional view showing the connection between the emission apparatus disposed in the hull of the vessel, and the observing or registering apparatus disposed in the navigation outfit.

A set of cables 44, Fig. 9, whose length varies according to the installation, connects the whole emitting and receiving arrangement 45 to the apparatus 46 for the control of the emission and for registering, which controls the whole installation and may thus be placed in any suitable position upon the vessel, and chiefly adjacent the navigation outfit. Like connections are employed in the case of registering upon a cylinder or by the said figure printing method.

The whole organization of the said devices constitutes an installation for navigation and safety which is adapted for the following purposes:

A. Sounding operations.
 1. Hydrographic observations and rapid formation of charts or maps.
 2. Rapid exploration of the bottom, in view of submarine work.
 3. Navigation and landing based upon the use of data afforded by sounding lines.
 4. Navigation during fog and upon a rocky bottom.

B. Cases of detection.
 1. Determination of the distance of submarine obstacles in general.
 2. Navigation during fog and upon a rocky bottom.
 3. Protection against collisions between vessels and against icebergs.

What we claim is:

1. Apparatus for sounding and locating submarine obstacles, comprising means for the emission and reception of ultra-audible waves, a variable resonance circuit connected to said means, an oscillating circuit cooperating with said resonance circuit and adapted to produce in said resonance circuit a single set of damped oscillations, means for actuating the oscillating circuit, a circuit of reception permanently connected to the resonance circuit, means in said circuit arranged to detect the pulsations of current produced in said circuit at the time of the emission and at the time of the reception.

2. Apparatus for sounding and locating submarines obstacles, comprising means for emission and reception of ultra-audible waves, a variable resonance circuit connected to said means, an oscillating circuit cooperating with said resonance circuit and adapted to produce in said resonance circuit a single set of damped oscillations, means for actuating the oscillating circuit, a circuit of reception permanently connected to the resonance circuit, means in said circuit, arranged to detect the pulsations of current produced in said circuit at the time of the emission and at the time of the reception, and means for measuring the time elapsed between these two pulsations.

In testimony whereof we have signed this specification.

PAUL LANGEVIN.
CHARLES LOUIS FLORISSON.